US009150313B2

(12) United States Patent
Puig-Suari et al.

(10) Patent No.: US 9,150,313 B2
(45) Date of Patent: Oct. 6, 2015

(54) CUBESAT SYSTEM, METHOD AND APPARATUS

(75) Inventors: Jordi Puig-Suari, San Luis Obispo, CA (US); Austin Williams, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 399 days.

(21) Appl. No.: 13/568,088

(22) Filed: Aug. 6, 2012

(65) Prior Publication Data
US 2014/0039729 A1 Feb. 6, 2014

(51) Int. Cl.
| | |
|---|---|
| *B64G 1/66* | (2006.01) |
| *B64G 1/10* | (2006.01) |
| *B64G 1/42* | (2006.01) |
| *B64G 1/54* | (2006.01) |
| *G06F 9/44* | (2006.01) |
| *B64G 1/28* | (2006.01) |
| *B64G 1/32* | (2006.01) |
| *B64G 1/36* | (2006.01) |

(52) U.S. Cl.
CPC .. *B64G 1/66* (2013.01); *B64G 1/10* (2013.01); *B64G 1/428* (2013.01); *B64G 1/546* (2013.01); *G06F 9/4406* (2013.01); *B64G 1/288* (2013.01); *B64G 1/32* (2013.01); *B64G 1/363* (2013.01); *B64G 1/366* (2013.01); *B64G 2001/1092* (2013.01)

(58) Field of Classification Search
CPC ............ B64G 1/66; B64G 1/10; B64G 1/288; B64G 1/32; B64G 1/363; B64G 1/366; B64G 1/428; B64G 1/546; B64G 2001/1092; G06F 9/4406
USPC .............................................................. 701/3
See application file for complete search history.

(56) References Cited

U.S. PATENT DOCUMENTS

| | | | | |
|---|---|---|---|---|
| 5,666,293 | A | * | 9/1997 | Metz et al. .................... 709/220 |
| 5,935,242 | A | * | 8/1999 | Madany et al. .................... 713/1 |
| 6,157,618 | A | * | 12/2000 | Boss et al. ..................... 370/252 |
| 7,024,592 | B1 | * | 4/2006 | Voas et al. .................... 714/47.3 |
| 2003/0204792 | A1 | * | 10/2003 | Cahill et al. ..................... 714/55 |
| 2003/0208654 | A1 | * | 11/2003 | Krontz et al. ................. 710/312 |
| 2005/0099960 | A1 | * | 5/2005 | Boss et al. ..................... 370/252 |
| 2007/0168725 | A1 | * | 7/2007 | Lee ................................. 714/23 |
| 2009/0013210 | A1 | * | 1/2009 | McIntosh et al. ................. 714/4 |

OTHER PUBLICATIONS

J. Schaffner and J. Puig-Suari, "The electronic system design, analysis, integration, and construction of the Cal Poly State. University CP1 cubesat," in Proceedings of the 16th Annual.*
Galysh, Ivan, et al. "CubeSat: developing a standard bus for picosatellites." International Symposium on Optical Science and Technology. International Society for Optics and Photonics, 2000.*
Manyak, Greg, and John M. Bellardo. "PolySat's Next Generation Avionics Design." Space Mission Challenges for Information Technology (SMC-IT), 2011 IEEE Fourth International Conference on. IEEE, 2011.*

* cited by examiner

Primary Examiner — Thomas G Black
Assistant Examiner — Ce Li
(74) Attorney, Agent, or Firm — Martine Penilla Group, LLP

(57) ABSTRACT

A satellite system includes a chassis, an avionics package included within an upper portion of the chassis. The avionics package includes a main system board, a payload interface board, at least one daughter board and a battery board. The main system board, the payload interface board, the at least one daughter board, and the battery board reside in substantially parallel planes. The payload interface board, the at least one daughter board, and the battery board are coupled to the main system board through one or more stackable connectors. A method of operating a satellite is also described.

19 Claims, 18 Drawing Sheets

| PRIMARY BREAKOUT CONNECTORS 250C1 (60 Pins Each) |||||||
|---|---|---|---|---|---|
| Signal | Pin# (J5 / J13) | Atmel Interface | Atmel Interface | Pin# (J5 / J13) | Signal |
| 5V0_PL | 2 / 1 | - | - | 1 / 2 | DEPLOY |
| 5V0_PL | 4 / 3 | - | - | 3 / 4 | 5V0_PL |
| 5V0_PL | 6 / 5 | - | - | 5 / 6 | 5V0_PL |
| 5V0_PL | 8 / 7 | - | - | 7 / 8 | 5V0_PL |
| 5V0_PL | 10 / 9 | - | - | 9 / 10 | 5V0_PL |
| 5V0_PL | 12 / 11 | - | - | 11 / 12 | 5V0_PL |
| 5V0_PL | 14 / 13 | - | - | 13 / 14 | 5V0_PL |
| 5V0_PL | 16 / 15 | - | - | 15 / 16 | 5V0_PL |
| PGOOD_5V0_PL | 18 / 17 | GPIO-EXP- | - | 17 / 18 | 5V0_PL |
| GND_SOLAR | 20 / 19 | - | - | 19 / 20 | NC |
| GND_SOLAR | 22 / 21 | - | - | 21 / 22 | GND_SOLAR |
| GND_SOLAR | 24 / 23 | - | - | 23 / 24 | GND_SOLAR |
| GND_SOLAR | 26 / 25 | - | - | 25 / 26 | GND_SOLAR |
| GND_SOLAR | 28 / 27 | - | - | 27 / 28 | GND_SOLAR |
| GND_SOLAR | 30 / 29 | - | - | 29 / 30 | GND_SOLAR |
| GND_SOLAR | 32 / 31 | - | - | 31 / 32 | GND_SOLAR |
| GND_SOLAR | 34 / 33 | - | - | 33 / 34 | GND_SOLAR |
| GND_SOLAR | 36 / 35 | - | - | 35 / 36 | GND_SOLAR |
| GND_SOLAR | 38 / 37 | - | - | 37 / 38 | GND_SOLAR |
| GND_SOLAR | 40 / 39 | - | - | 39 / 40 | GND_SOLAR |
| GND_SOLAR | 42 / 41 | - | - | 41 / 42 | GND_SOLAR |
| GND_SOLAR | 44 / 43 | - | - | 43 / 44 | GND_SOLAR |
| GND_SOLAR | 46 / 45 | - | - | 45 / 46 | GND_SOLAR |
| GND_SOLAR | 48 / 47 | - | - | 47 / 48 | GND_SOLAR |
| GND_SOLAR | 50 / 49 | - | - | 49 / 50 | GND_SOLAR |
| GND_SOLAR | 52 / 51 | - | - | 51 / 52 | GND_SOLAR |
| URQ2 | 54 / 53 | PC14 | PC16 | 53 / 54 | GPIO4 |
| UNREG | 56 / 55 | - | * | 55 / 56 | HDMA |
| UNREG | 58 / 57 | - | * | 57 / 58 | HDPA |
| UNREG | 60 / 59 | - | * | 59 / 60 | NRST |

| Primary Breakout Connectors 250C (140 Pins Each) ||||||
|---|---|---|---|---|---|
| Signal | Pin# (J6 / J12) | Atmel Interface | Atmel Interface | Pin# (J6 / J12) | Peripheral A | Peripheral B | GPIO |
| | 2 / 1 | -- | -- | 1 / 2 | | | |
| | 4 / 3 | -- | -- | 3 / 4 | | | |
| | 6 / 5 | -- | -- | 5 / 6 | | | |
| | 8 / 7 | -- | -- | 7 / 8 | | | |
| | 10 / 9 | -- | -- | 9 / 10 | | | |
| | 12 / 11 | -- | -- | 11 / 12 | | | |
| | 14 / 13 | -- | -- | 13 / 14 | | | |
| | 16 / 15 | -- | -- | 15 / 16 | | | |
| | 18 / 17 | -- | -- | 17 / 18 | | | |
| | 20 / 19 | -- | -- | 19 / 20 | | | |
| | 22 / 21 | -- | -- | 21 / 22 | | | |
| | 24 / 23 | -- | PB20 | 23 / 24 | -- | | |
| | 26 / 25 | -- | PB21 | 25 / 26 | -- | | |
| | 28 / 27 | -- | PB22 | 27 / 28 | DSR0 | | |
| | 30 / 29 | -- | PB23 | 29 / 30 | DCD0 | | |
| | 32 / 31 | -- | PB24 | 31 / 32 | DTR0 | | |
| | 34 / 33 | -- | PB25 | 33 / 34 | RI0 | | |
| | 36 / 35 | -- | PB26 | 35 / 36 | RTS0 | | |
| | 38 / 37 | -- | PB27 | 37 / 38 | CTS0 | | |
| | 40 / 39 | -- | PB19 | 39 / 40 | TX00 | | |
| DBB_PASS3 | 42 / 41 | -- | PB11 | 41 / 42 | RX03 | | |
| GND_POWER | 44 / 43 | -- | PB12 | 43 / 44 | TX01 | | |
| GND_POWER | 46 / 45 | -- | PB13 | 45 / 46 | RX01 | | |
| GND_POWER | 48 / 47 | -- | PB29 | 47 / 48 | -- | | |
| GND_POWER | 50 / 49 | -- | PB30 | 49 / 50 | PCK0 | | |
| GND_POWER | 52 / 51 | -- | PB28 | 51 / 52 | -- | | |
| GND_POWER | 54 / 53 | -- | PB31 | 53 / 54 | PCK1 | | |
| GND_POWER | 56 / 55 | -- | -- | 55 / 56 | GND_POWER | | |
| GND_POWER | 58 / 57 | -- | GPIO-EXP | 57 / 58 | PGOOD_3V3_Pl | | |
| GND_POWER | 60 / 59 | -- | PB17 | 59 / 60 | I2C_TWD1 | | |
| GND_POWER | 62 / 61 | -- | PB18 | 61 / 62 | I2C_TWCK1 | | |
| GND_POWER | 64 / 63 | -- | PA25 | 63 / 64 | I2C_TWCK0 | | |
| GND_POWER | 66 / 65 | -- | PA24 | 65 / 66 | I2C_TWCK0 | | |
| GND_POWER | 68 / 67 | -- | PA4 | 67 / 68 | RTS2 | | |
| GND_POWER | 70 / 69 | -- | PA5 | 69 / 70 | CTS2 | -- | |
| GND_POWER | 72 / 71 | -- | PA26 | 71 / 72 | | | |
| GND_POWER | 74 / 73 | -- | PA27 | 73 / 74 | | | |
| GND_POWER | 76 / 75 | -- | PA28 | 75 / 76 | | | |
| GND_POWER | 78 / 77 | -- | PA29 | 77 / 78 | | | |
| GND_POWER | 80 / 79 | -- | PA30 | 79 / 80 | SCK2 | RX04 | |
| GND_POWER | 82 / 81 | -- | PA31 | 81 / 82 | SCK0 | TX04 | |
| GND_POWER | 84 / 83 | -- | PB4 | 83 / 84 | TX02 | -- | |
| GND_POWER | 86 / 85 | -- | PB5 | 85 / 86 | RX02 | | |
| GND_POWER | 88 / 87 | -- | PB6 | 87 / 88 | TX07 | -- | |
| GND_POWER | 90 / 89 | -- | PB7 | 89 / 90 | RX03 | | |
| GND_POWER | 92 / 91 | -- | MUXED | 91 / 92 | SPI1_CS2 | | |
| GND_POWER | 94 / 93 | -- | MUXED | 93 / 94 | SPI1_CS3 | | |
| GND_POWER | 96 / 95 | -- | MUXED | 95 / 96 | SPI1_CS4 | | |
| GND_POWER | 98 / 97 | -- | MUXED | 97 / 98 | SPI1_CS5 | | |
| GND_POWER | 100 / 99 | -- | MUXED | 99 / 100 | SPI1_CS6 | | |
| GND_POWER | 102 / 101 | -- | PC8 | 101 / 102 | ALERT_A | | |
| GND_POWER | 104 / 103 | -- | GPIO-EXP | 103 / 104 | RTC_INT | | |
| GND_POWER | 106 / 105 | -- | MUXED | 105 / 106 | SPI1_CS8 | | |
| DBB_PASS2 | 108 / 107 | -- | MUXED | 107 / 108 | SPI1_CS10 | | |
| | 110 / 109 | -- | MUXED | 109 / 110 | SPI1_CS11 | | |
| | 112 / 111 | -- | MUXED | 111 / 112 | SPI1_CS12 | | |
| | 114 / 113 | -- | MUXED | 113 / 114 | SPI1_CS13 | | |
| | 116 / 115 | -- | MUXED | 115 / 116 | SPI1_CS14 | | |
| | 118 / 117 | -- | MUXED | 117 / 118 | SPI1_CS15 | | |
| | 120 / 119 | -- | -- | 119 / 120 | DBB_PASS1 | | |
| | 122 / 121 | -- | PC13 | 121 / 122 | IRQ0 | | |
| | 124 / 123 | -- | -- | 123 / 124 | DBB_PASS0 | | |
| | 126 / 125 | -- | -- | 125 / 126 | DBA_PASS0 | | |
| | 128 / 127 | -- | -- | 127 / 128 | GND_POWER | | |
| | 130 / 129 | -- | PB0 | 129 / 130 | SPI1_MISO | | |
| | 132 / 131 | -- | -- | 131 / 132 | GND_POWER | | |
| | 134 / 133 | -- | PB1 | 133 / 134 | SPI1_MOSI | | |
| | 136 / 135 | -- | -- | 135 / 136 | GND_POWER | | |
| | 138 / 137 | -- | PB2 | 137 / 138 | SPI1_SPCK | | |
| | 140 / 139 | -- | -- | 139 / 140 | GND_POWER | | |

Daughterboard A Connectors

| 240B | J3 (20 Pins) | | | 240A | J4 (20 Pins) | | |
|---|---|---|---|---|---|---|---|
| Signal | Pin# | Atmel Interface | Atmel Interface | Pin# | Peripheral A | Peripheral B | GPIO |
| UNREG | 1 | -- | PB19 | 1 | | | |
| UNREG | 2 | -- | PA24 | 2 | I2C_TWCK0 | | |
| UNREG | 3 | -- | PA23 | 3 | I2C_TWD0 | | |
| UNREG | 4 | -- | -- | 4 | DBA_PASS0 | | |
| UNREG | 5 | -- | PB8 | 5 | TXD1 | -- | |
| UNREG | 6 | -- | PB7 | 6 | RXD1 | | |
| GND_POWER | 7 | -- | PC15 | 7 | IRQ1 | | |
| GND_POWER | 8 | -- | GPIO-EXP | 8 | PGOOD_DBA_REG | | |
| GND_POWER | 9 | -- | -- | 9 | | | |
| GND_POWER | 10 | -- | -- | 10 | GND_POWER | | |
| GND_POWER | 11 | -- | -- | 11 | GND_POWER | | |
| GND_POWER | 12 | -- | PB1 | 12 | SPI1_MOSI | | |
| GND_POWER | 13 | -- | -- | 13 | GND_POWER | | |
| GND_POWER | 14 | -- | PB0 | 14 | SPI1_MISO | | |
| DBA_REG | 15 | -- | -- | 15 | GND_POWER | | |
| | 16 | -- | PB2 | 16 | SPI1_SPCK | | |
| | 17 | -- | -- | 17 | GND_SOLAR | | |
| | 18 | -- | MUXED | 18 | SPI1_CS7 | | |
| | 19 | -- | -- | 19 | HARD_REBOOT | | |
| | 20 | -- | * | 20 | NRST | | |

Daughterboard B Connectors

| 240B' | J7 (25 Pins) | | | 240A' | J8 (25 Pins) | | |
|---|---|---|---|---|---|---|---|
| Signal | Pin# | Atmel PIO | Atmel PIO | Pin# | Peripheral A | Peripheral B | GPIO |
| UNREG | 1 | -- | PB1 | 1 | SPI1_MOSI | | |
| UNREG | 2 | -- | PB0 | 2 | SPI1_MISO | | |
| UNREG | 3 | -- | PB2 | 3 | SPI1_SPCK | | |
| UNREG | 4 | -- | PA24 | 4 | I2C_TWCK0 | | |
| UNREG | 5 | -- | PA23 | 5 | I2C_TWD0 | | |
| UNREG | 6 | -- | -- | 6 | | | |
| UNREG | 7 | -- | -- | 7 | | | |
| HARD_REBOOT | 8 | -- | -- | 8 | | | |
| GND_SOLAR | 9 | -- | -- | 9 | DBB_PASS1 | | |
| HDP1 | 10 | * | -- | 10 | DBB_PASS2 | | |
| HDM1 | 11 | -- | -- | 11 | DBB_PASS3 | | |
| IRQ2 | 12 | PC14 | -- | 12 | GND_POWER | | |
| GND_BATTERY | 13 | -- | -- | 13 | GND_POWER | | |
| GND_BATTERY | 14 | -- | -- | 14 | GND_POWER | | |
| GND_BATTERY | 15 | -- | -- | 15 | GND_POWER | | |
| GND_BATTERY | 16 | -- | -- | 16 | GND_POWER | | |
| GND_BATTERY | 17 | -- | -- | 17 | GND_POWER | | |
| GND_BATTERY | 18 | -- | PB8 | 18 | TXD2 | -- | |
| GND_BATTERY | 19 | -- | PB9 | 19 | RXD2 | | |
| GND_BATTERY | 20 | -- | PC1 | 20 | SPI1_CS16 | | |
| GND_BATTERY | 21 | -- | -- | 21 | DBB_PASS4 | | |
| | 22 | -- | -- | 22 | | | |
| | 23 | -- | GPIO-EXP | 23 | PGOOD_DBB_REG | | |
| | 24 | -- | PC2 | 24 | -- | PCK1 | |
| | 25 | -- | * | 25 | NRST | | |

| Umbilical A 304 (41 Pin) | | |
|---|---|---|
| Signal | Pin# | Atmel PIO |
| DRXD | 1 | PB14 |
| DTXD | 2 | PB15 |
| DDM | 3 | * |
| DDP | 4 | * |
| HDMA | 5 | * |
| HDPA | 6 | * |
| HDMB | 7 | * |
| HDPB | 8 | * |
| DEPLOY | 9 | -- |
| MEM_ISOLATE | 10 | -- |
| UMB_1 | 11 | -- |
| UMB_2 | 12 | -- |
| SPI1_CS16 | 13 | PC1 |
| GND_BATTERY | 14 | -- |
| GND_BATTERY | 15 | -- |
| ETHERNET | 16 | * |
| GND_POWER | 17 | -- |
| ETHERNET | 18 | * |
| GND_POWER | 19 | -- |
| ETHERNET | 20 | * |
| GND_POWER | 21 | -- |
| ETHERNET | 22 | * |
| GND_POWER | 23 | -- |
| ETHERNET | 24 | * |
| GND_POWER | 25 | -- |
| ETHERNET | 26 | * |
| ETHERNET | 27 | * |
| ETHERNET | 28 | * |
| ETHERNET | 29 | * |
| ETHERNET | 30 | * |
| NRST | 31 | * |
| SPI1_NPCS0 | 32 | PB3 |
| SPI1_NPCS1 | 33 | PC5 |
| SPI1_NPCS2 | 34 | PC4 |
| SPI1_NPCS3 | 35 | PC3 |
| SPI1_MISO | 36 | PB0 |
| SPI1_MOSI | 37 | PB1 |
| SPI1_SPCK | 38 | PB2 |
| POWER_SW | 39 | -- |
| HARD_REBOOT | 40 | -- |
| UMB_INDICATOR | 41 | GPIO-EXP |

| Umbilical B 306 (51 Pin) | | |
|---|---|---|
| Signal | Pin# | Atmel PIO |
| PAYLOAD_PASS[0] | 1 | -- |
| PAYLOAD_PASS[1] | 2 | -- |
| PAYLOAD_PASS[2] | 3 | -- |
| IRQ0 | 4 | PC12 |
| IRQ1 | 5 | PC15 |
| ISI_D0 | 6 | PB20 |
| ISI_D1 | 7 | PB21 |
| ISI_D2 | 8 | PB22 |
| ISI_D3 | 9 | PB23 |
| ISI_D4 | 10 | PB24 |
| ISI_D5 | 11 | PB25 |
| ISI_D6 | 12 | PB26 |
| ISI_D7 | 13 | PB27 |
| ISI_D8 | 14 | PB10 |
| ISI_D9 | 15 | PB11 |
| ISI_D10 | 16 | PB12 |
| ISI_D11 | 17 | PB13 |
| ISI_VSYNC | 18 | PB29 |
| ISI_HSYNC | 19 | PB30 |
| ISI_PCK | 20 | PB28 |
| ISI_MCK | 21 | PB31 |
| RTS2 | 22 | PA4 |
| CTS2 | 23 | PA5 |
| SCK2 | 24 | PA26 |
| SCK3 | 25 | PA27 |
| SCK4 | 26 | PA28 |
| SCK5 | 27 | PA29 |
| SCK2_RXD4 | 28 | PA30 |
| SCK0_TXD4 | 29 | PA31 |
| TXD0 | 30 | PB4 |
| RXD0 | 31 | PB5 |
| TXD2 | 32 | PB8 |
| RXD2 | 33 | PB9 |
| RXD4 | 34 | PB16 |
| TXD4 | 35 | PB19 |
| TXD1 | 36 | PB6 |
| PCK1 | 37 | PC2 |
| IRQ | 38 | * |
| IRQ | 39 | * |
| IRQ | 40 | * |
| IRQ | 41 | * |
| IRQ | 42 | * |
| RESET | 43 | * |
| RESET | 44 | * |
| RXD1 | 45 | PB7 |
| I2C_TWD1 | 46 | PB17 |
| I2C_TWCK1 | 47 | PB18 |
| IRQ2 | 48 | PC14 |
| ALERT_A | 49 | PC0 |
| I2C_TWCK0 | 50 | PA24 |
| I2C_TWD0 | 51 | PA23 |

Optional Battery Board Connector 320 (15 Pin)

| Signal | Pin# | Atmel PIO |
|---|---|---|
| UNREG | 1 | -- |
| UNREG | 2 | -- |
| UNREG | 3 | -- |
| UNREG | 4 | -- |
| UNREG | 5 | -- |
| UNREG | 6 | -- |
| UNREG | 7 | -- |
| I2C_TWCK0 | 8 | PA24 |
| I2C_TWD0 | 9 | PA23 |
| GND_BATTERY | 10 | -- |
| GND_BATTERY | 11 | -- |
| GND_BATTERY | 12 | -- |
| GND_BATTERY | 13 | -- |
| GND_BATTERY | 14 | -- |
| GND_BATTERY | 15 | -- |

Payload Passthrough 308 (8 Pin)

| Signal | Pin# | Atmel PIO |
|---|---|---|
| GND_POWER | 1 | PB14 |
| GND_POWER | 2 | PB15 |
| PAYLOAD_PASS[0] | 3 | * |
| PAYLOAD_PASS[1] | 4 | * |
| PAYLOAD_PASS[2] | 5 | * |
| GND_POWER | 6 | * |
| GND_POWER | 7 | * |
| GND_POWER | 8 | * |

FIG. 7H

CUBESAT SYSTEM, METHOD AND APPARATUS

BACKGROUND

The present invention relates generally to satellites, and more particularly, to systems, methods and apparatus for pico-class satellite avionics.

Satellites have traditionally been relatively large-scale, usually government funded very specialized and focused projects. Satellite electronics packages (i.e., avionics) were typically developed specifically for one specialized mission objective corresponding to the mission of the satellite itself. Further, typical satellite avionics packages were packaged in a customized form factor corresponding to the actual satellite vehicle that also reflected the specialized mission objective.

The individualized development of each satellite vehicle and mission results in much of the engineering and development from one satellite avionics project having very little use in a second satellite avionics project. Thus requiring an entirely new development cycle at much greater cost. By way of example, the avionics of a first satellite would not physically fit within a second satellites airframe even if the mission operations were similar. Thus an entirely new packaging must be custom fit to each satellite.

In more recent history much of space exploration is being undertaken by small organizations such as schools and businesses, rather than as a government-funded project. As a result there is a need for smaller, less costly, more flexible satellite avionics designs that may be re-usable and easily adaptable across a wide range of satellite missions.

SUMMARY

Broadly speaking, the present invention fills these needs by providing a smaller, less costly, more flexible satellite avionics designs that is re-usable and easily adaptable across a wide range of satellite missions. It should be appreciated that the present invention can be implemented in numerous ways, including as a process, an apparatus, a system, computer readable media, or a device. Several inventive embodiments of the present invention are described below.

One embodiment provides a satellite system including a chassis, an avionics package included within an upper portion of the chassis. The avionics package includes a main system board, a payload interface board, at least one daughter board and a battery board. The main system board, the payload interface board, the at least one daughter board, and the battery board reside in substantially parallel planes. The payload interface board, the at least one daughter board, and the battery board are coupled to the main system board through one or more stackable connectors.

The main system board can include a long duration timer having a selectable time interval of between about one day and about 12 months. The long duration timer can be configured to interrupt power to at least a portion of the satellite when the long duration timer counts down to zero.

The main system board can include a processor coupled to a non-volatile phase change memory system and a volatile memory system. The non-volatile phase change memory system can include an image of an operating system stored therein in a computer readable media. The processor can include logic stored in a computer readable media for retrieving the operating system image stored in the non-volatile phase change memory system, logic stored in a computer readable media for storing the retrieved operating system image in the volatile memory system, logic stored in a computer readable media for calculating a checksum value of the operating system image stored in the volatile memory system and comparing the calculated the checksum value with a known value, logic stored in a computer readable media for initiating a hard reboot if the calculated the checksum value is not equal to the known value and logic stored in a computer readable media for initiating booting the operating system from the volatile memory system if the calculated the checksum value is equal to the known value.

The main system board can include a removable umbilical system coupled to the main system board by an umbilical connector. The umbilical connector can provide access to operate and debug the avionics system and a payload portion of the satellite. The removable umbilical can include an Ethernet port. The removable umbilical can include a breakout of each one of multiple data lines, multiple control lines and multiple voltage rails in the avionics package and the payload portion of the satellite. The removable umbilical can include rewrite access to the phase change non-volatile memory in the main system board.

The main system board can include a power ground selectively coupled to a first portion of avionics package components through a first low side switch and a solar ground coupled to a battery ground during flight through a second low side switch.

Another embodiment provides a method of resetting a satellite including selecting an interval for a long duration timer of between about one day and about 12 months, allowing the long duration timer to count down to zero, interrupting power to at least a portion of the satellite and rebooting the at least a portion of the satellite.

Interrupting power to at least the portion of the satellite can include interrupting a battery ground to at least the portion of the satellite. Interrupting power to at least the portion of the satellite includes interrupting power to at least the portion of the satellite for less than about 1.0 seconds.

Yet another embodiment provides a method of rebooting a satellite including retrieving an operating system image stored in a non-volatile phase change memory system, storing the retrieved operating system image in the volatile memory system, calculating a checksum value of the operating system image stored in the volatile memory system, comparing the calculated the checksum value with a known value, initiating a hard reboot if the calculated the checksum value is not equal to the known value and booting the operating system from the volatile memory system if the calculated the checksum value is equal to the known value.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIGS. 7A-H provide listings of the pin outs of the respective connectors on the main system board and the corresponding connections, in accordance with embodiments of the present invention.

DETAILED DESCRIPTION

Figure 1A:
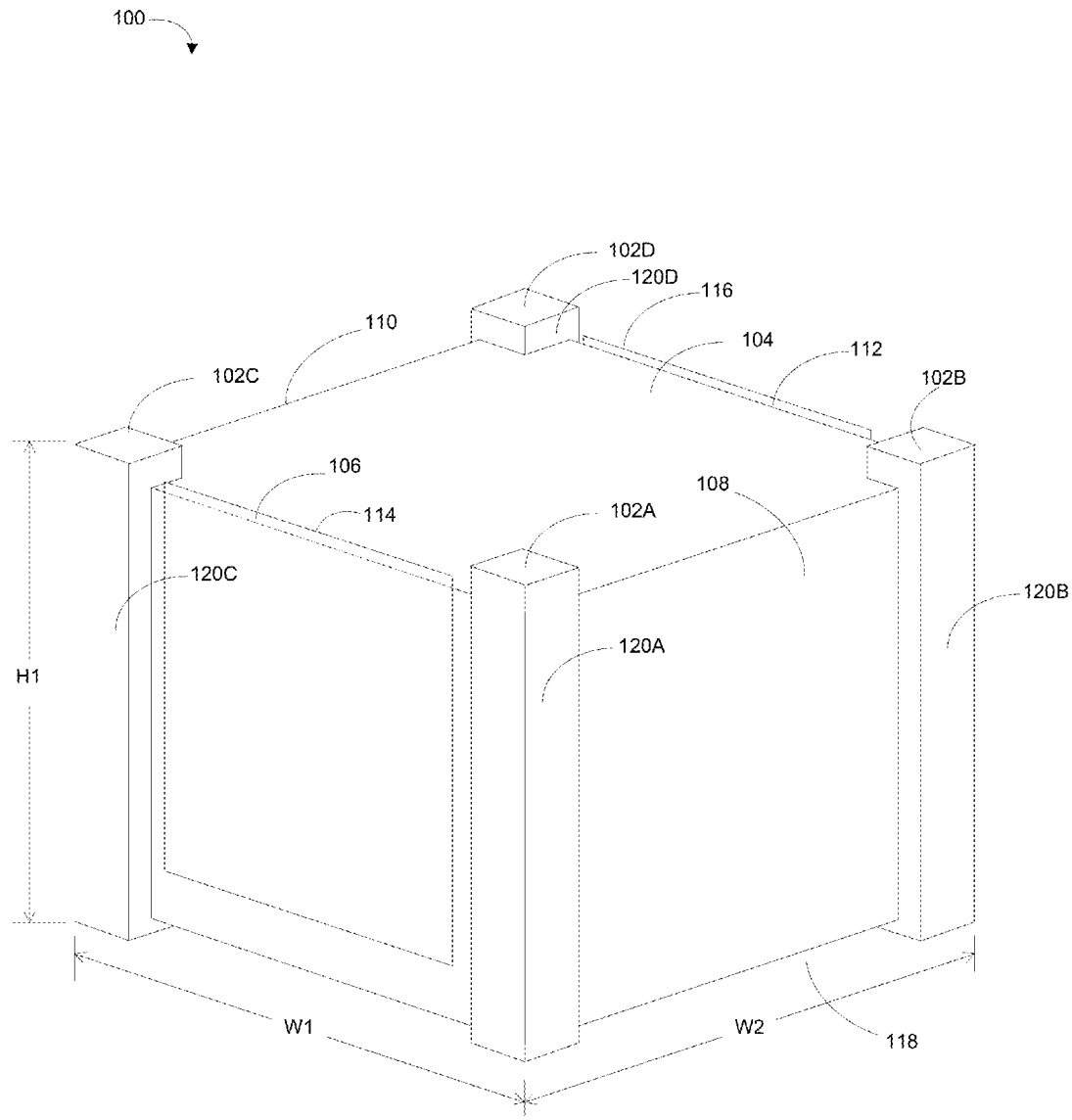
FIG. 1A is an example of a single unit satellite, in accordance with embodiments of the present invention.

Several exemplary embodiments for smaller, less costly, more flexible satellite avionics packages will now be described. It will be apparent to those skilled in the art that the present invention may be practiced without some or all of the specific details set forth herein.

Some of the features of a smaller, less costly, more flexible, re-usable and easily adaptable satellite avionics designs include a standardized form factor or packaging for a standardized satellite unit size. The standardized packaging of the avionics provides a standardized physical volume for the satellite mission payload. The standardized physical volume for the satellite mission payload provides a known volume for the mission developers to utilize.

The standardized packaging of the avionics also provides an easily scalable satellite form factor. Multiple, small avionics packages can be used to operate multiple experiments (payloads) in a single satellite. By way of example, a single unit form factor can include a complete satellite including an avionics package and one or more payloads. A multiple unit e.g. 3-unit, form factor can include three complete, individualized satellites, each satellite containing an avionics package and one or more payloads. Alternatively, a 3-unit, form factor can include a first single satellite consuming a 2-unit form factors and a second single satellite consuming a 1-unit form factor, each satellite containing an avionics package and one or more payloads. In yet another alternative, a 3-unit, form factor can include a single satellite consuming a 3-unit form factor containing an avionics package and one or more payloads.

Another feature of a smaller, less costly, more flexible, re-usable and easily adaptable satellite avionics designs include an umbilical board capable of providing a remote communication link to the avionics package. The remote communications link provides remote access to the avionics package during the satellite development stage. The umbilical board may also be removable before deployment and thus the volume, weight and power consumption of the umbilical board subsystem can be excluded from the deployed satellite. Typical remote communication links used serial type ports or Ethernet type connections that would fly with the satellite. Unfortunately, serial type ports or Ethernet type adds weight and consumes power and volume in the satellite that cannot be used during the satellite's flight.

Another feature of a smaller, less costly, more flexible, re-usable and easily adaptable satellite avionics designs include a standardized satellite power system. The satellite power system can be combined on a single main board with the computer to more efficiently use the limited volume available.

Another feature of a smaller, less costly, more flexible, re-usable and easily adaptable satellite avionics designs include a standardized physical and electrical interface to the satellite mission payload. Physical and electrical interface to the processor and other functional blocks within the main system board can be provided by use of one or more stackable connectors. The stackable connectors provide a payload user optional access to and use of a portion of the functionality of the processor and other functional blocks of the main system board of the avionics package.

Radiation hardening is a common design aspect to satellites. Typical approaches use radiation hardened components and subassemblies and circuits however these systems tend to be very expensive, often several generations old in technology, and thus provide limited performance for very high cost. Another feature of a smaller, less costly, more flexible, re-usable and easily adaptable satellite avionics designs include addresses the radiation hardening from a new approach to the problem. Rather than using shielding to prevent periodic, radiation caused disruptions, plan that those radiation caused disruptions will occur, and program in a periodic reset that will reset the avionics to a known base operation configuration. This approach allows use of more advanced hardware providing more processing power, in a smaller, lighter package, using less energy, and having greater memory capacity that is also more space and power efficient than traditional radiation hardened components. These non-radiation hardened components are also much less expensive. These non-radiation hardened components can also be more state-of-the-art using more state-of-the-art operating systems interface systems and more advanced software.

FIG. 1A is an example of a single unit satellite 100, in accordance with embodiments of the present invention. The form factor of the single satellite 100 as shown is a single unit form factor. The single unit form factor has a standardized form factor bounded by the height H1, width W1 and depth W2. By way of example, the height H1, width W1 and depth W2 are about 100.0+/−0.1 mm.

The single unit form factor includes a top 104, sides 106, 108, 110, 112, a bottom 118 and rails 120A-D. Access ports 114 and 116 are provided in sides 106 and 112, respectively. The access ports 114 and 116 provide access to the internal volume of the single unit form factor. Each end 102A-102D of the rails 120A-D can include one or more deployment switches and/or separation springs that assist in the deployment and/or separation of the satellite 100 from the launch/deployment vehicle.

Figure 1B:
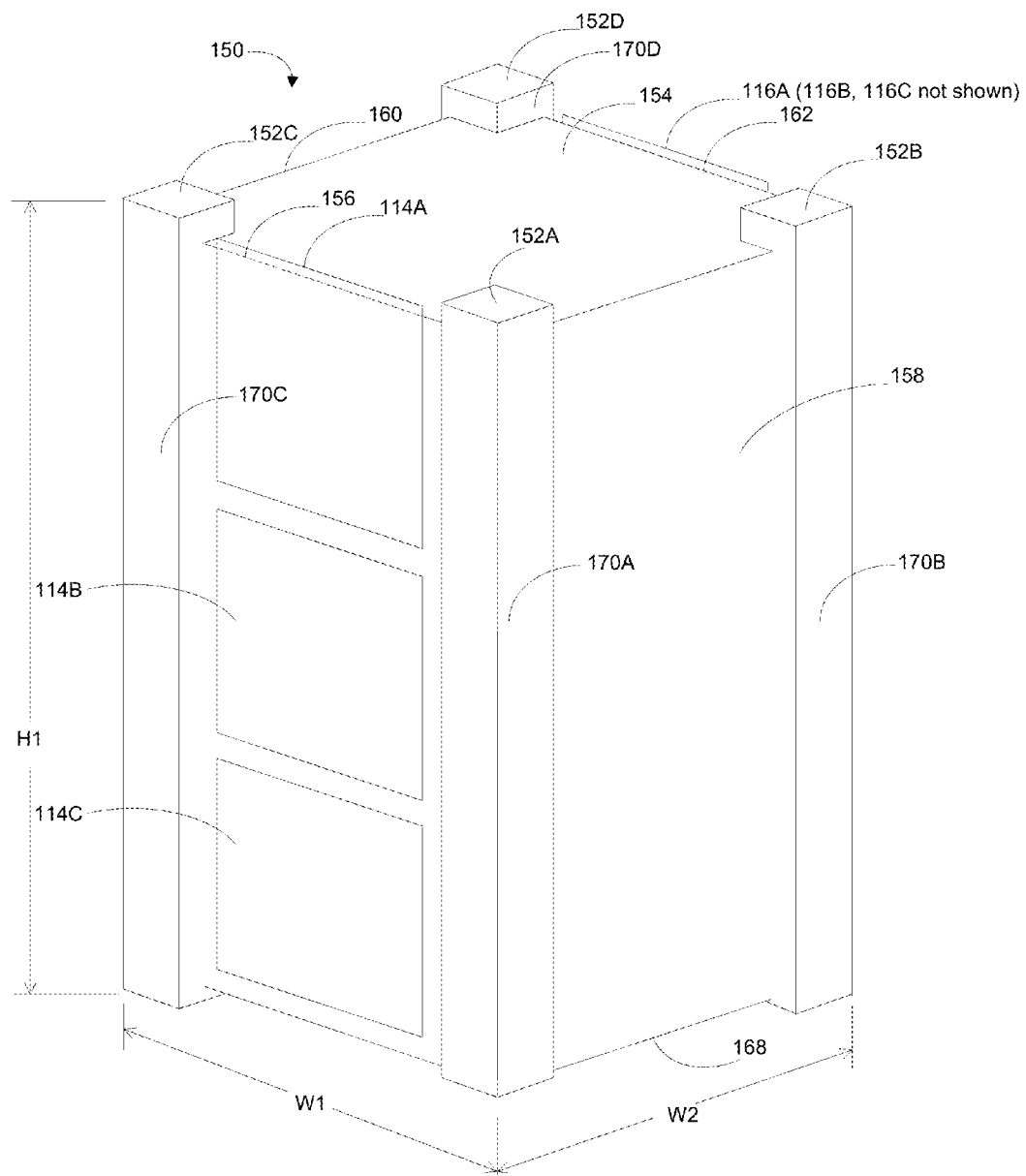
FIG. 1B is an example of a 3-unit satellite, in accordance with embodiments of the present invention.

FIG. 1B is an example of a 3-unit satellite 150, in accordance with embodiments of the present invention. The form factor of the single satellite 150 as shown is a 3-unit form factor. The 3-unit form factor has a standardized form factor bounded by the same width W1 and depth W2 as the single unit form factor shown in FIG. 1A. The 3-unit form factor has a standardized height of three times (e.g., 3H1) the single unit height H1 shown in FIG. 1A. The 3-unit form factor includes a top 154, sides 156, 158, 160, 162, a bottom 168 and rails 170A-D. Access ports 114A-114C and 116A-116C are provided in sides 156 and 162, respectively. The access ports 114A-114C and 116A-116C, provide access to the internal volume of the 3-unit form factor. Each end 152A-152D of the rails 170A-D can include one or more deployment switches and/or separation springs that assist in the deployment and/or separation of the satellite 150 from the launch/deployment vehicle.

Figure 2A:
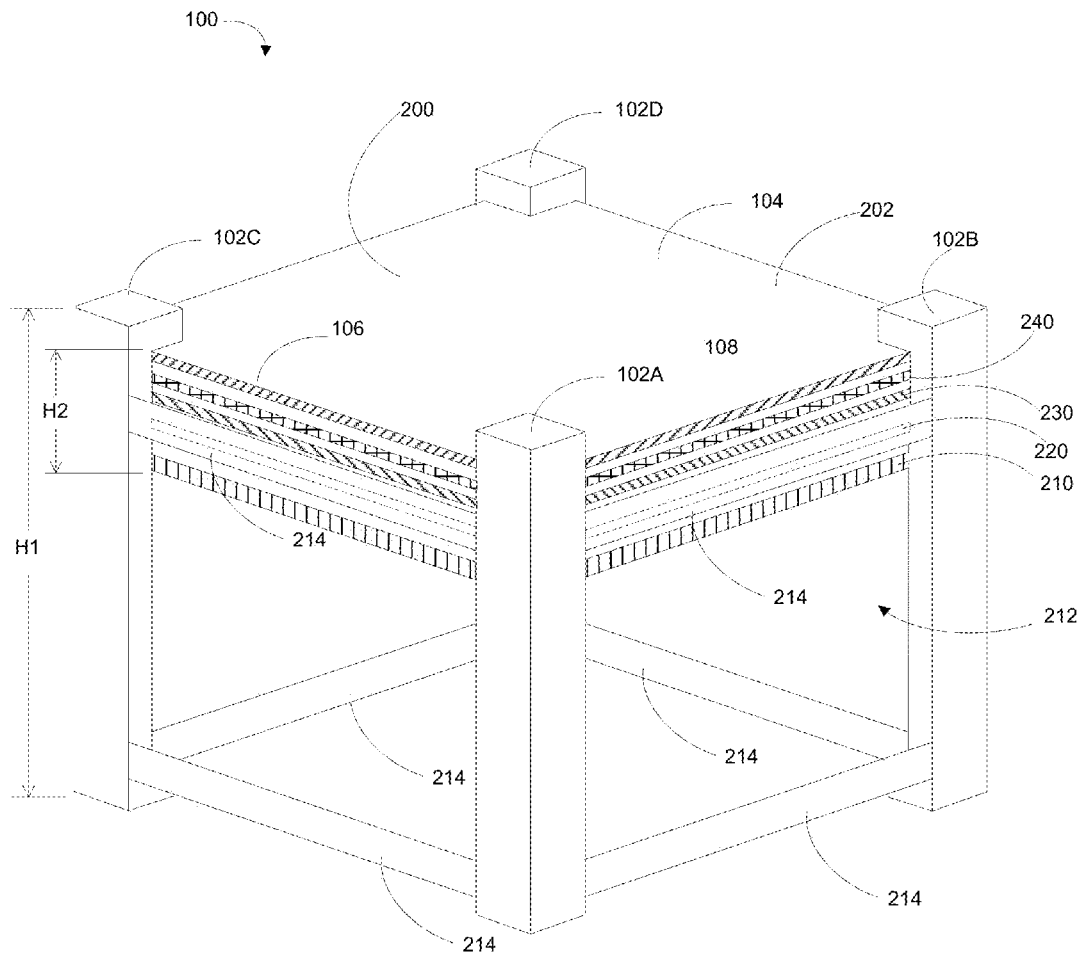
FIG. 2A is an avionics package in single unit satellite, in accordance with embodiments of the present invention.

FIG. 2A is an avionics package 200 in single unit satellite 100, in accordance with embodiments of the present invention. The avionics package 200 includes multiple layers or boards 202, 210, 220, 230, 240. The avionics package 200 is included within the upper portion H2 of the height H1 of the single unit satellite 100 chassis. The single unit satellite 100 chassis is formed from chassis members 214 and rails 120A-120D. The upper portion H2 includes about 30+/−0.1 mm of the height H1 near the top 102 of the single unit satellite 100.

Figure 2B:
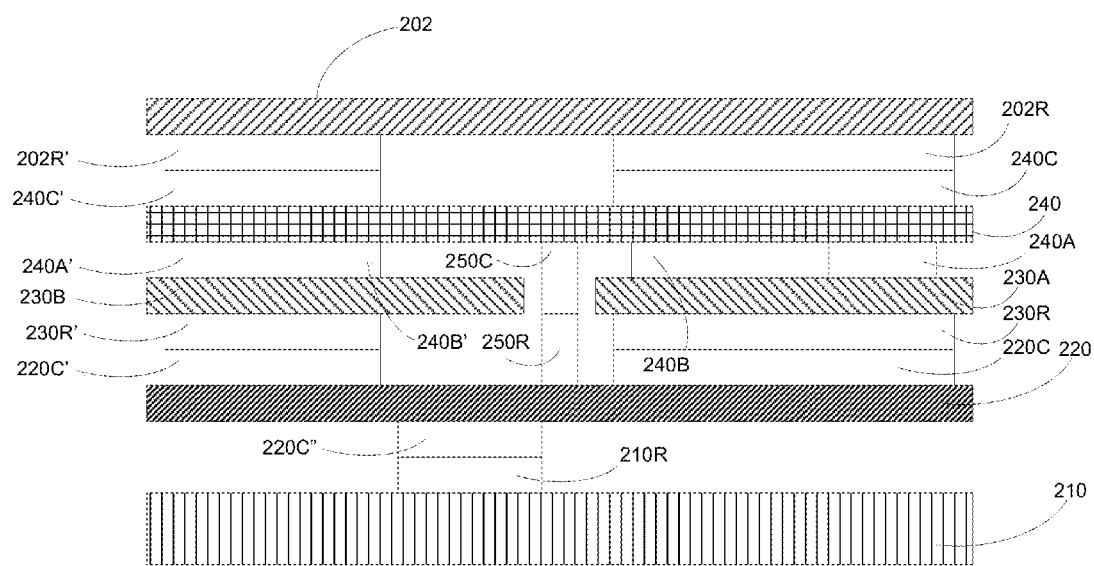
FIG. 2B is a side view of the avionics package, in accordance with embodiments of the present invention.
Figure 2C:
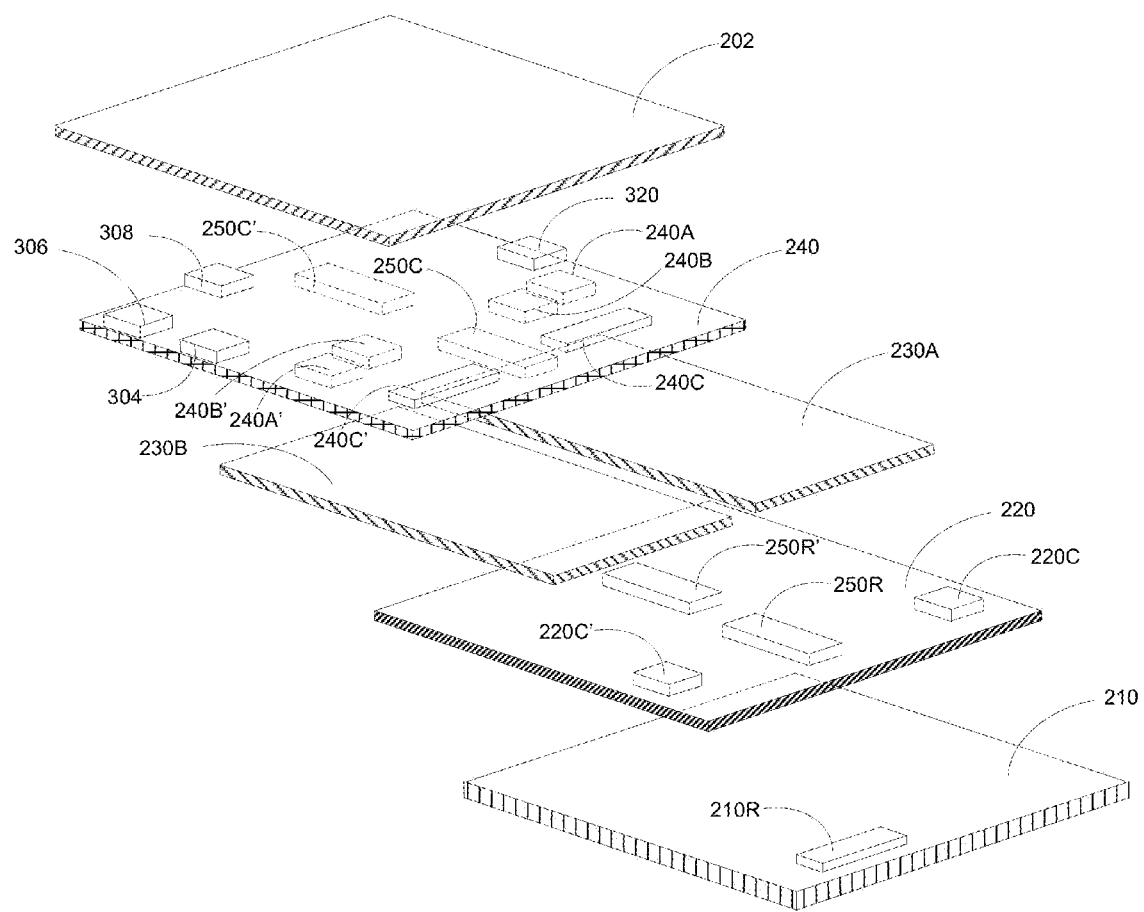
FIG. 2C is a separation view of the avionics package, in accordance with embodiments of the present invention.

FIG. 2B is a side view of the avionics package 200, in accordance with embodiments of the present invention. FIG. 2C is a separation view of the avionics package 200, in accordance with embodiments of the present invention. The avionics package 200 includes Z-panel 202, battery board 210, payload interface board 220, daughter boards 230A, 230B and main system board 240. The boards 202, 210, 220, 230, 240 that are interconnected with respective connectors 240C, 240C', 220C, 220C', 220C'' and corresponding receptacles 202R, 202R', 230R, 230R', 210R. Daughter board connectors 240A, 240A' connect the main system board 240 to the respective daughter boards 230A, 230B. Interboard stack connectors 250C, 250C' connect the main system board 240 to the receptacles 250R, 250R' on the payload interface board 220.

Figure 3A:
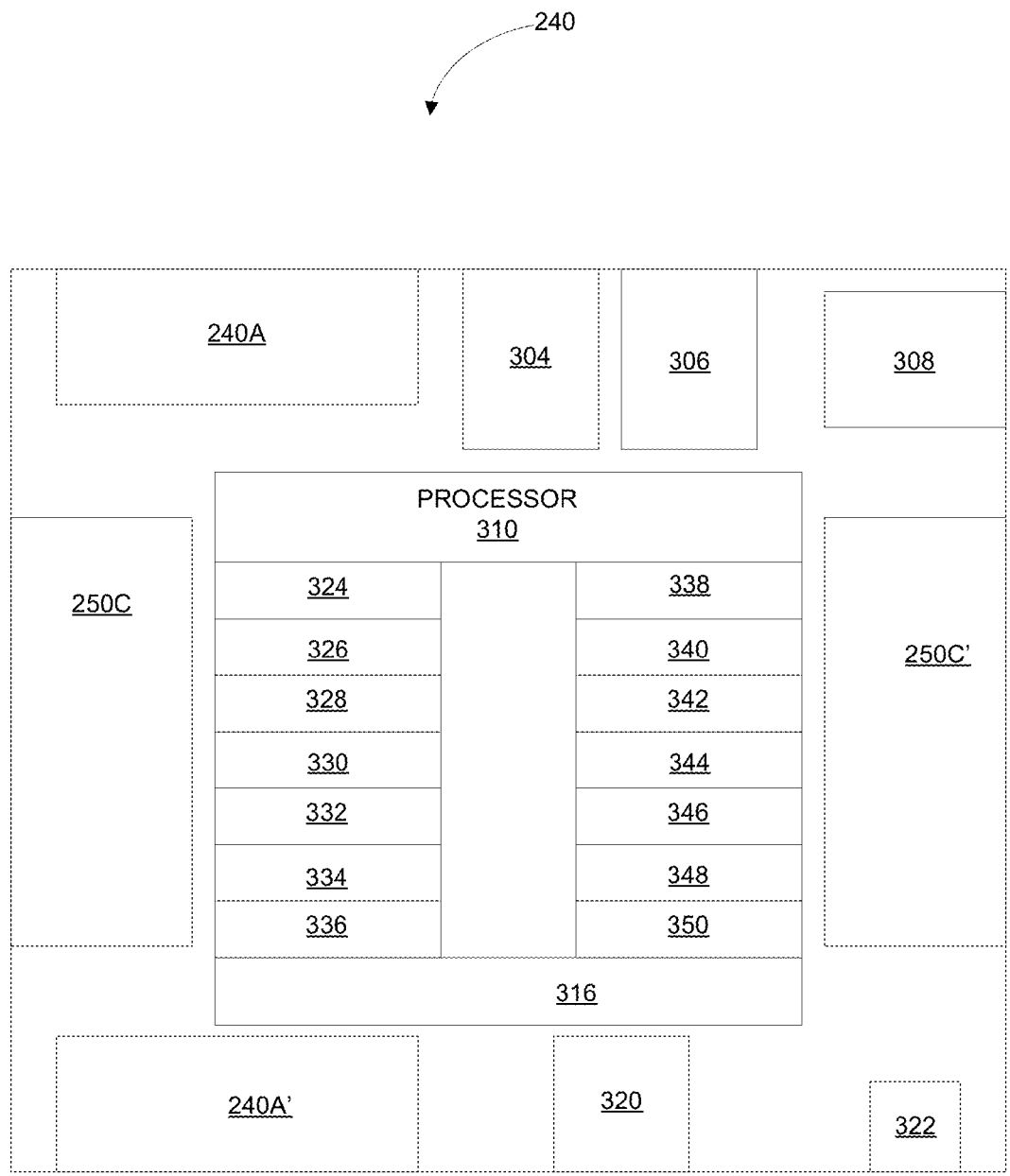
FIG. 3A is a block diagram of the system board, in accordance with embodiments of the present invention.

FIG. 3A is a block diagram of the system board 240, in accordance with embodiments of the present invention. The system board 240 is electrically connected to the other boards and the payload through one or more of the interboard stack connectors 250C, 250C', daughter board connectors 240A, 240A', umbilical interface connectors 304, 306, payload passthrough connector 308, battery module connector 320 and a structure ground connector 322.

The system board 240 includes a processor 310, memory modules 338, 340, 342, memory expansion port 344, real time clock 346, 3-axis gyro 348, hardware monitor 350, power sensors 334, temperature sensors, deployment and power up interfaces and electronics 316 and multiple power outputs 324-332. The processor 310 is described in more detail below. The memory modules 338, 340, 342 include random access memory 338, read only memory 340 and programmable memory 342. The memory expansion port 344 provides a port to add readily available memory such as flash memory. The 3-axis gyro 348 provides a physical orientation reference for the processor and can be accessed by the payload.

The real time clock 346 provides a timing reference for the processor and can be accessed by the payload. Hardware monitor 350, power sensors 334, temperature sensors monitor operational parameters so that the processor 310 can manage the system. The deployment and power up interfaces and electronics 316 provide interfaces with the launch and deployment system external to the satellite 100. The multiple power outputs 324-332 provide various power limited voltages to other boards and the payload. The processor 310 can manage (e.g., turn on, off, etc.) the various power limited voltages output to the respective boards and payload.

Figure 3B:
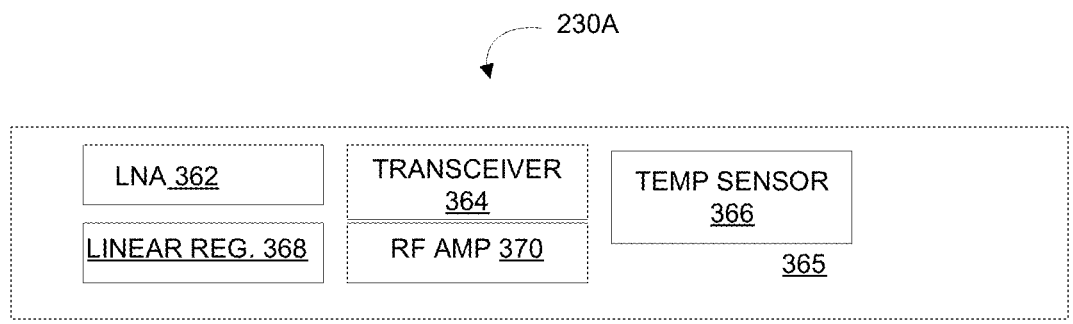
FIG. 3B is a block diagram of the daughter board, in accordance with embodiments of the present invention.

FIG. 3B is a block diagram of the daughter board 230A, in accordance with embodiments of the present invention. The daughter board 230A if the RF board providing UHF radio for the avionics package to communicate back to the earth during the mission. The daughter board 230A is coupled to the main system board 240 through daughter board connector 240A.

The daughter board 230A includes a UHF transceiver 364. The UHF transceiver 364 is coupled to a low noise amplifier (LNA) 362, a linear regulator 368, RF power amplifier 370 and a temperature sensor 366. The daughter board 230A also includes an RF shield 365 that shields the main system board 240 and other boards from the RF generated in the daughter board 230A. The daughter board 230A is also coupled to an antenna 367 as described in more detail below.

Figure 3C:
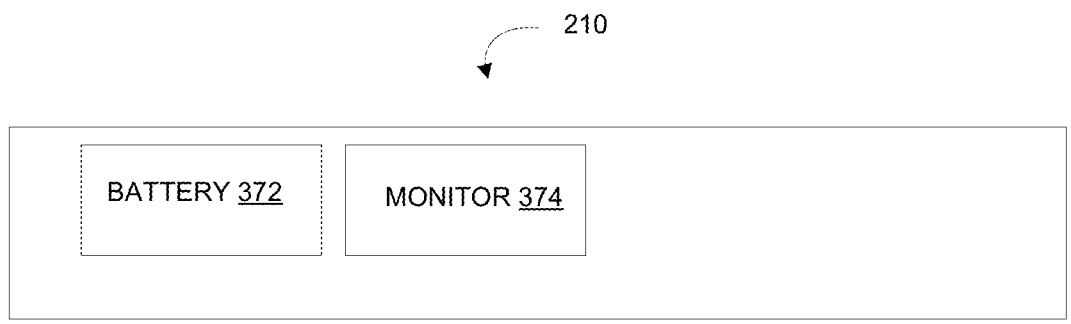
FIG. 3C is a block diagram of the battery board, in accordance with embodiments of the present invention.

FIG. 3C is a block diagram of the battery board 210, in accordance with embodiments of the present invention. The battery board 210 includes one or more battery assemblies 372 and corresponding battery monitors 374. The battery monitor 374 monitors the condition of the battery and communicates the condition to the processor 310 so that the processor can determine how to manage the recharging of and the load coupled to the battery assembly 372.

Each battery assembly 372 can include multiple separate cells that are assembled into the desired form factor/package to provide the desired voltage and current storage capacity. Having the battery assembly 372 on the dedicated battery board 210 allows the avionics package 200 to have a power source that makes the most efficient use of the volume available without being dependent on a previously packaged battery.

Figure 3D:
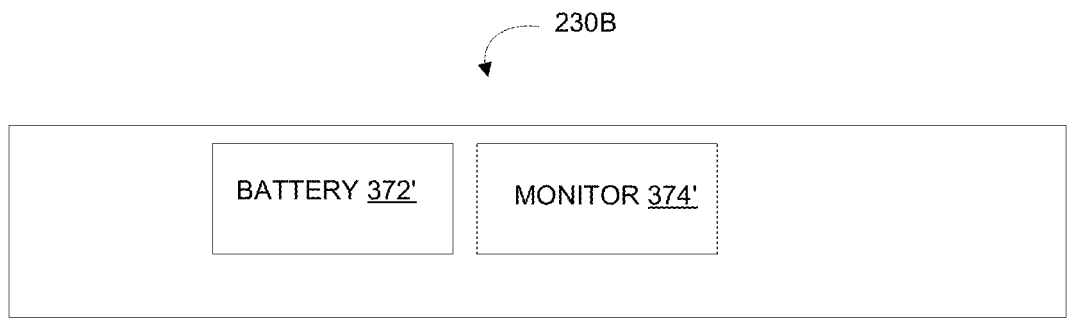
FIG. 3D is a block diagram of the second daughter board, in accordance with embodiments of the present invention.

FIG. 3D is a block diagram of the second daughter board 230B, in accordance with embodiments of the present invention. The second daughter board 230B can include one or more battery assemblies 372' and corresponding battery monitors 374'. This may be useful for providing additional battery storage capacity for the avionics package 200. In other embodiments, the second daughter board 230B can include additional functionality and/or instrumentation to aid the main system board 240 or the payload.

Figure 3E:
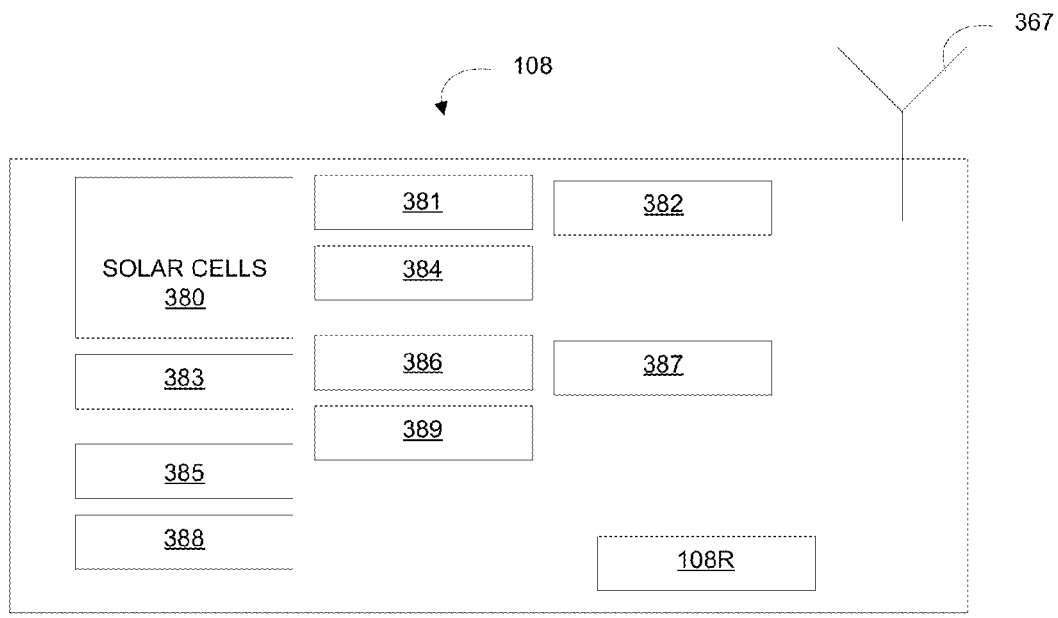
FIG. 3E is a block diagram of a side panel, in accordance with embodiments of the present invention.

FIG. 3E is a block diagram of a side panel 108, in accordance with embodiments of the present invention. The side panel 108 forms the side of the single unit satellite 100 and also includes multiple functional blocks. The side panel 108 includes multiple solar cells 380, 12C buffer hub 381, a 2-axis sun sensor 382, a 3-axis magnetometer 383, temperature sensors 384, power sensors 385, torquer coils 387, 5.0V slides 388 and 3.0V slides 389. The side panel 108 also includes the antenna 367 that is coupled to the first daughter board 230A. The side panel 108 is coupled to the main board through a side panel receptacle 108R coupled to the inter board stack connector 250C.

Figure 3F:
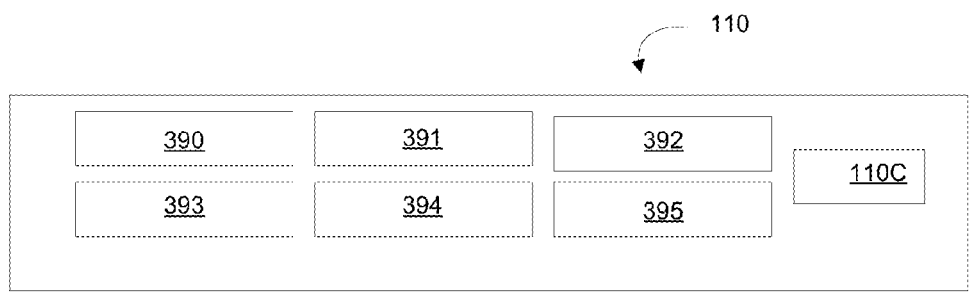
FIG. 3F is a block diagram of a side panel, in accordance with embodiments of the present invention.

FIG. 3F is a block diagram of a side panel 110, in accordance with embodiments of the present invention. The side panel 110 forms the side of the single unit satellite 100 and also includes multiple functional blocks. The side panel 110 is coupled to the side panel 108 through the side panel receptacle 108R and a connector 110C. The side panel 110 includes multiple solar cells 390, a 2-axis sun sensor 391, a 3-axis magnetometer 392, temperature sensors 393, power sensors 394 and torquer coils 395. Additional side panels 106, 112, 118 substantially similar to side panel 110 can also be included.

Figure 4:
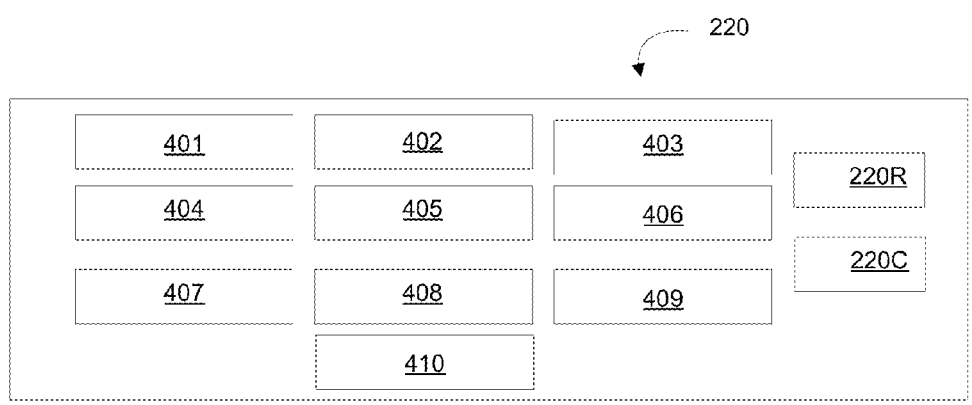
FIG. 4 is a block diagram of the payload interface board, in accordance with embodiments of the present invention.

FIG. 4 is a block diagram of the payload interface board 220, in accordance with embodiments of the present invention. The payload interface board 220 provides electrical power and data connections between the payload and the avionics package 200. The payload interface board 220 can include cameras 401, 402 oriented in selected directions, e.g., forward and aft. The payload interface board 220 can also include power sensors 403, temperature sensors 404 and multiple voltage and power regulated sources 405, 406 that may be needed by the payload.

The payload interface board 220 can also include multiple isolated voltage and power regulated sources 407, 408 that may be needed by the payload. A CMOS ISI level shifter 409 and a LVDS 410 can also be included. It is important to note that the payload interface board 220 may be customized to meet the needs of the payload. However, even a customized payload interface board 220 would have a standardized interconnection with the main system board 240. The payload interface board 220 includes one or more electrical connectors 220C to connect to the payload.

Figure 5A:
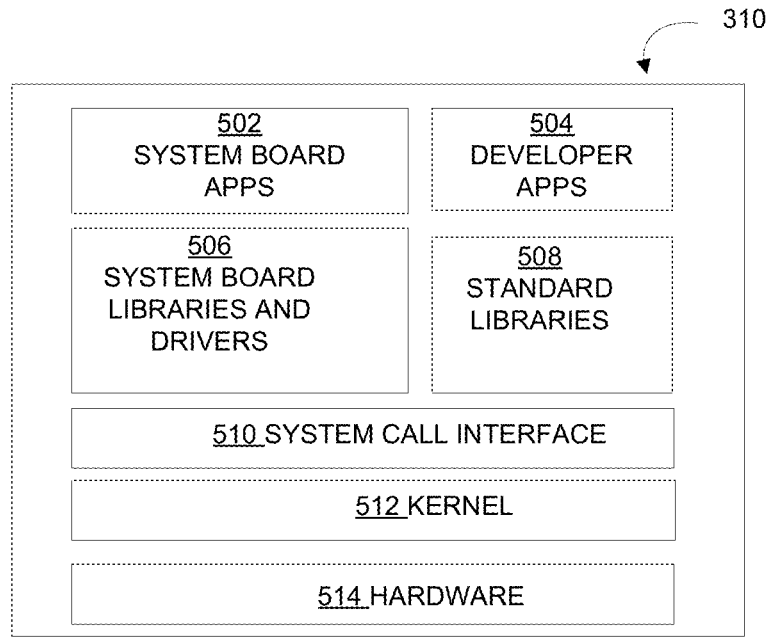
FIG. 5A is a functional block diagram of the processor, in accordance with embodiments of the present invention.

FIG. 5A is a functional block diagram of the processor 310, in accordance with embodiments of the present invention. The processor 310 hardware layer 514 includes the processor hardware and the assorted buses and peripherals to complete a processor system. Residing on the hardware layer 514 is an operating system kernel 512 that communicates with and instructs the hardware layer. The operating system kernel 512 can be any suitable operating system. One embodiment uses a Linux operating system kernel so as to maintain the open access to the functionality of the processor 310.

A system call interface layer 510 resides on the operating system kernel 512. System board libraries and drivers 506 reside on the system call interface 510 layer. A selection of standard libraries 508 also reside on the system call interface 510 layer. Main system board applications 502 are the applications utilizing the components and system on the main system board 240. Main system board applications 502 use the system board libraries and drivers 506 to access operating system kernel 512 and the hardware layer 514. Developer applications 504 are the applications available for the payload user to utilize the standard libraries 508 to access operating system kernel 512 and the hardware layer 514 and thus allow the payload user access to the processor 310.

Figure 5B:
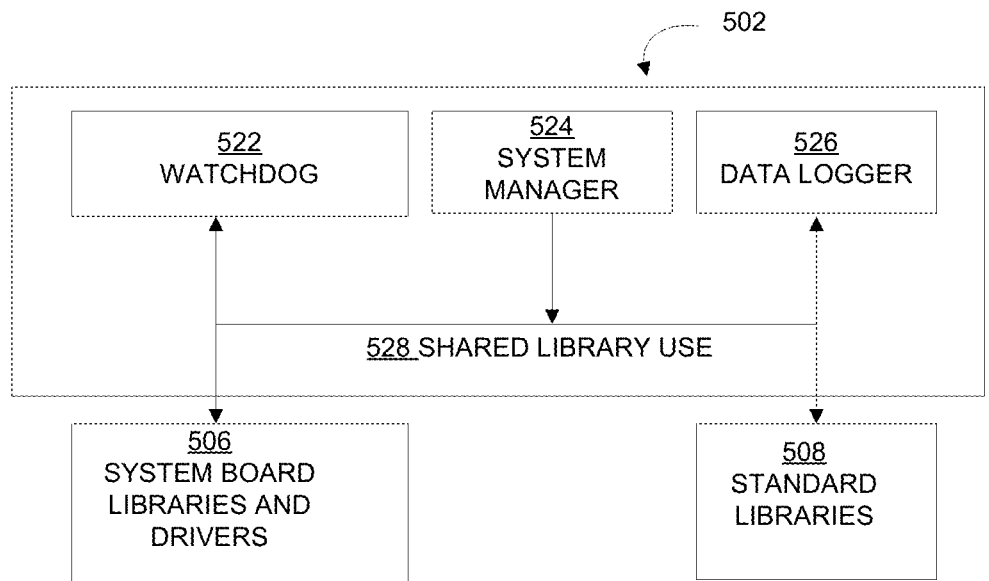
FIG. 5B is a functional block diagram of the main system board applications, in accordance with embodiments of the present invention.

FIG. 5B is a functional block diagram of the main system board applications 502, in accordance with embodiments of the present invention. The main system board applications 502 are designed to be single threaded, continuously executing, or static processes. The watchdog process 522 is responsible for hardware watchdog tap and detecting software anomalies within other processes.

A system manager 524 is responsible for overseeing system wide events (e.g., reboot) and maintaining system state, such as collecting housekeeping telemetry and other statistics from the kernel 512. The system manager 524 includes access to data acquisition drivers for the various sensors included in the avionics package 200.

A data logger 526 periodically stores housekeeping telemetry in an on-board database. The data logger 526 can also be utilized by the payload to record mission specific and payload data.

The system board libraries and drivers 506 includes a selection of standard functions for a given programming language (e.g., C, C++, Python, etc.) and a selection of custom avionics library base designed to provide abstractions to several common features that are readily available on the satellite 100. An event handling process executes certain callbacks at a periodic rate or a one shot timed event. A configuration management process allows for dynamic process configuration using configuration files rather than requiring process recompilation. An inter process communication process provides an operating system standard mechanism to communicate thus making the communications readily available to developers. An error/debug interface process provides an error logging and debug interface that can be used during development. A command handling process can easily be set up to receive and respond to commands from the ground (e.g., through the RF communications) or from other processes.

The mission payload developer can also use their own developer applications 504 for mission specific functionality, in parallel with the main system board applications 502. Mission specific functionality can include unique payload interfacing. The standard libraries 508 are available to assist the developer in a variety of existing functions (e.g., I/O, data compression, etc.)

Figure 6:
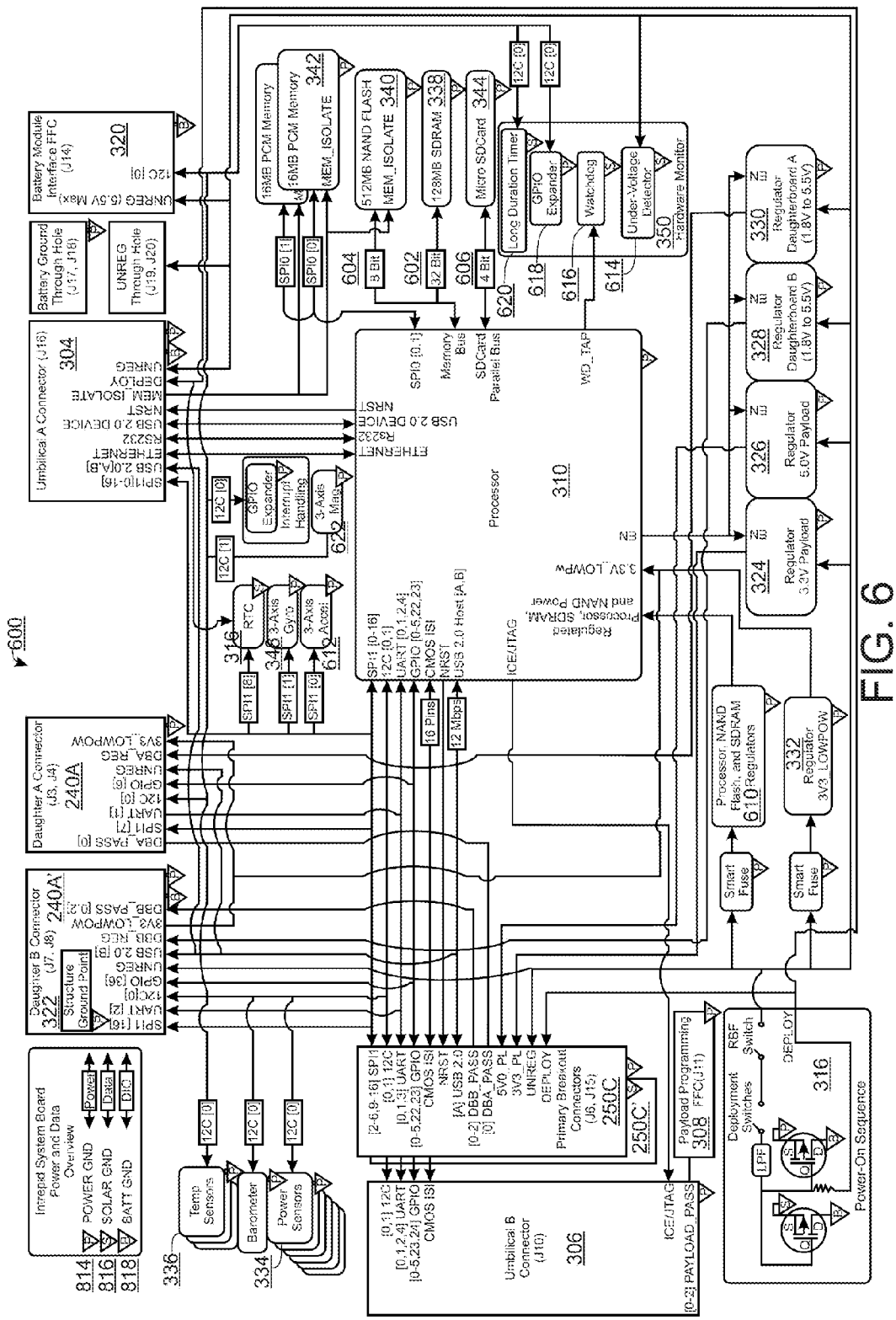
FIG. 6 is a more detailed block diagram of the main system board, in accordance with embodiments of the present invention.

FIG. 6 is a more detailed block diagram 600 of the main system board 240, in accordance with embodiments of the present invention. The detailed block diagram 600 of the main system board 240 shows many of the interconnections among the various components but the complete interconnection is not shown. It is important to note such details as the width of the busses 602, 604, 606 between the processor 310 and the memories 338, 340, 344.

FIGS. 7A-H provide listings 702-716 of the pin outs of the respective connectors on the main system board 240 and the corresponding connections, in accordance with embodiments of the present invention. FIG. 7A provides a pin out listing 702 of the interboard stack connector 250C'. FIG. 7B provides a pin out listing 704 of the interboard stack connector 250C. FIG. 7C provides a pin out listing 706 of the daughter board connector 240A between the main system board 240 and the first daughter board 230A. FIG. 7D provides a pin out listing 708 of the daughter board connector 240A' between the main system board 240 and the second daughter board 230B. FIG. 7E provides a pin out listing 710 of the umbilical interface connector 304 on the main system board 240 so as to provide external access to several data, control and voltage lines on the main system board and the satellite as a whole. FIG. 7F provides a pin out listing 712 of the umbilical interface connector 306 on the main system board 240 so as to provide external access to several data, control and voltage lines on the main system board and the satellite as a whole. FIG. 7G provides a pin out listing 714 of the battery board connector 320 between the main system board 240 and the battery board 210. FIG. 7H provides a pin out listing 716 of the payload passthrough connector 308 between the main system board 240 and the payload.

Figure 8:
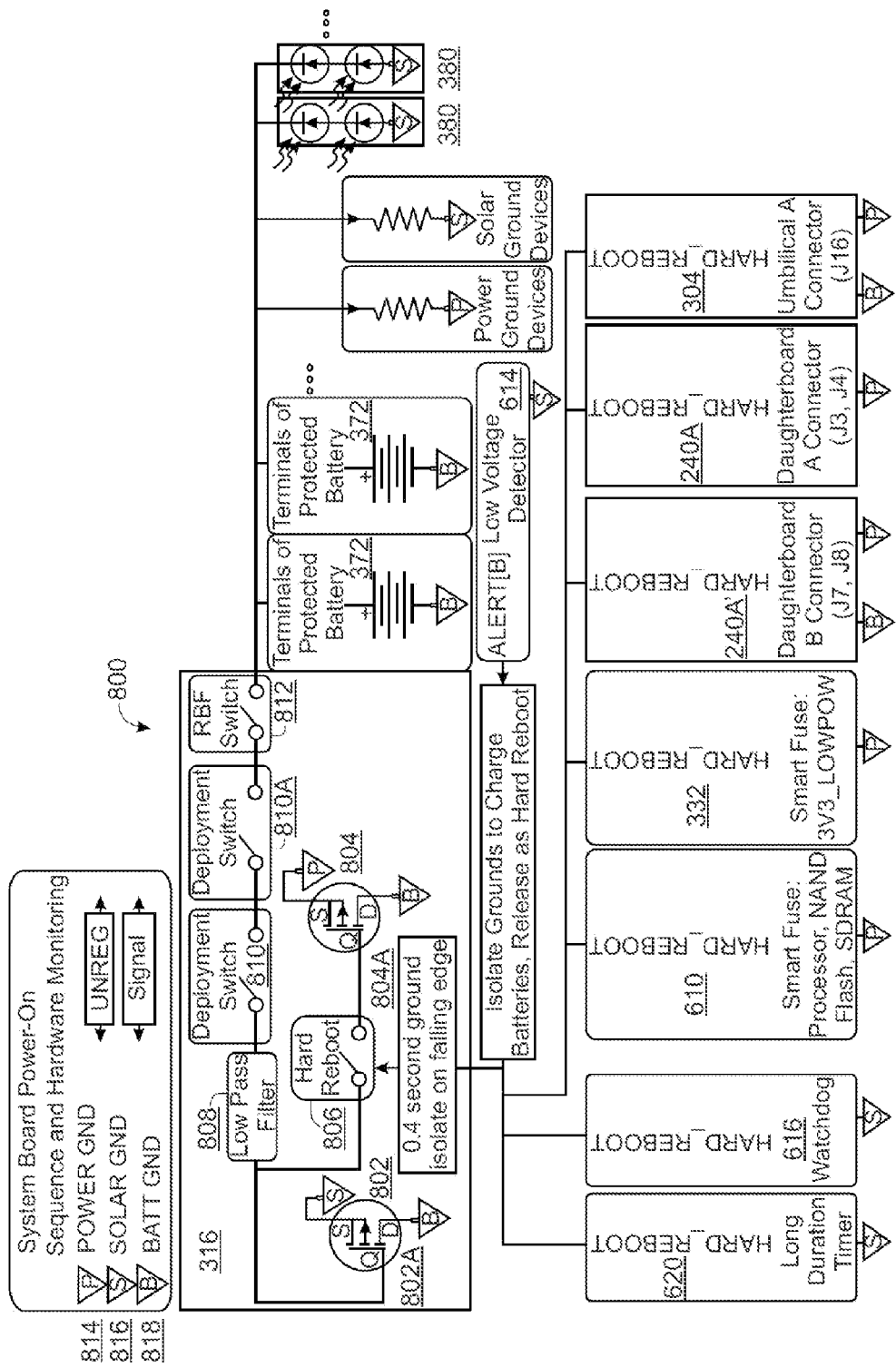
FIG. 8 is a block diagram of the avionics package for power on, hard reboot and solar cell interface, in accordance with embodiments of the present invention.

FIG. 8 is a block diagram 800 of the avionics package 200 for power on, hard reboot and solar cell interface, in accordance with embodiments of the present invention. The avionics package 200 includes three ground rails: power ground 814, solar ground 816 and battery ground 818. The RBF (remove before flight) switch 812 and the two series deployment switches 810, 810A isolate all three grounds 814, 816, 818 and thus only current flow is to battery protection circuitry built in to the batteries 372. Removing (closing) the RBF switch 812 and closing the deployment switches 810, 810A, couples the three grounds together through low side switches (transistors, MOSFETs, or other suitable electronic switch device) 802, 804 and the current can flow through the entire system to power on the entire system.

During a hard reboot all hardware monitor devices will perform a hard reboot in the same manner by isolating power ground 814 from battery ground 818 for a time sufficient to discharge and shutdown the systems using power ground as a return current path. By way of example, disconnecting power ground from battery ground for about 0.4 seconds or more will cause a shutdown in the systems using power ground as a return current path because the current can no longer return to the battery ground (negative terminal of the battery 372). Power ground is disconnected from battery ground by removing the bias voltage from the gate 804A of low side switch 804. When the bias voltage from the gate 804A of low side switch 804 is removed, then current can no longer pass across low side switch 804 from power ground to battery ground, thus preventing current flow through the systems using power ground as a current return path. Solar ground 816 is not isolated from battery ground 818 after the RBF (remove before flight) switch 812 is removed (e.g., closed) and deployment switches 810, 810A are closed. Solar ground remains coupled to battery ground through low side switch 802 as long as the gate 802A is biased. As a result, the systems using solar ground 816 as a current return path remain unaffected by hard reboots as the solar ground current return path remains coupled to the battery ground throughout a hard reboot sequence. A hard reboot also resets the state of both the watchdog 616 and the long-duration timer 620.

A direct energy transfer is the simplest method for interfacing solar cells 380 to the battery system 372. In this configuration, solar cells 380 output a 5.5 v maximum, with diode protection, directly to the terminals of the protected batteries 372. The batteries 372 and any active system load set the power point for the solar cells 380.

Figure 9:
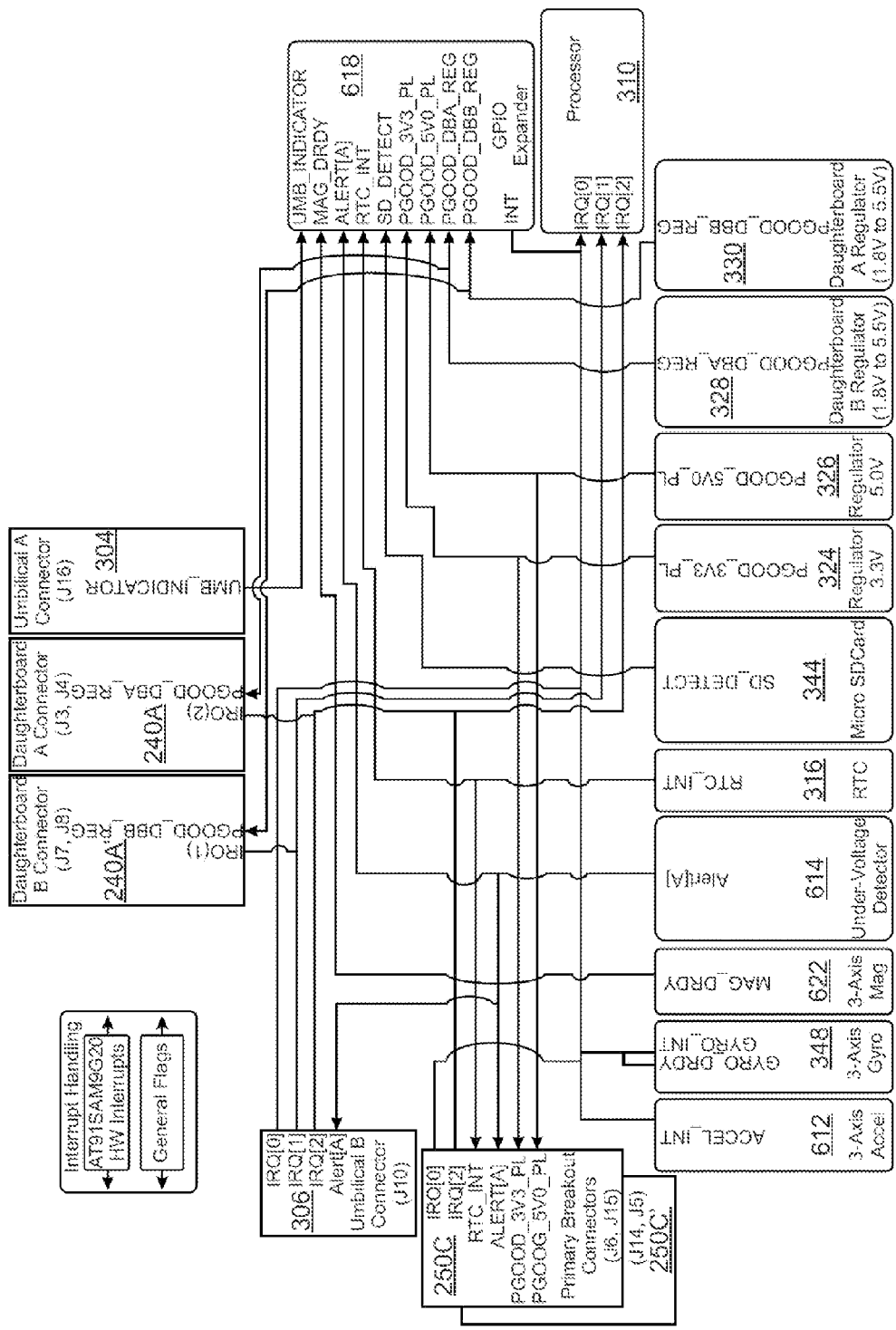
FIG. 9 is a block diagram of the interrupt distribution in the avionics package, in accordance with embodiments of the present invention.

FIG. 9 is a block diagram of the interrupt distribution in the avionics package 200, in accordance with embodiments of the present invention. The interrupts are divided into two categories: hardware interrupts (light lines) and general flags (bold lines).

Radiation Reset and Recovery

Commercial off the shelf (COTS) components are not designed for the space environment and are not radiation hardened. Therefore, certain mechanisms need to be added to recover from radiation-induced affects that often occur in space. The avionics package 200 essentially performs a power cycle and reboot if an anomaly is detected. The events that can cause a power cycle and reboot can include:

A smart fuse 617A, 617B over-current detection

A battery under voltage detection (battery 372 having a depleted state of charge)

The processor watchdog circuit 616

A planned reboot initiated by the tong duration timer 620

An over-temperature condition

A robust avionics package needs to reliably boot into the operating system after a power cycle reset event. A boot or reboot requires retrieving an operating system image from non-volatile memory 342, and storing the image into volatile memory 338 so the processor 310 can boot the operating system and return to operational status. Unfortunately, radiation can corrupt the operating system image stored in the typical non-volatile memory. The corruption includes random bit flips throughout the operating system image stored in the typical non-volatile memory. The traditional approach is to use specially designed, radiation hardened (i.e., shielded) memory and other devices throughout the avionics package 200 to resist the radiation caused corruption. However, even radiation hardened circuits will eventually become corrupted because the radiation shielding does not fully protect the avionics package 200.

In one embodiment, the non-volatile memory 342 is phase change memory (PCM-type). PCM is radiation resistant, and will not experience random bit flips in the memory due to radiation. However, PCM is susceptible to random bit flips during retrieving the image from the PCM, even though the memory cell still holds the correct value. Re-reading the bit provides the correct value. The retrieved image is stored in the volatile memory 338, and a checksum of the stored image is compared to a known value to determine if a retrieving error occurred.

Figure 10:
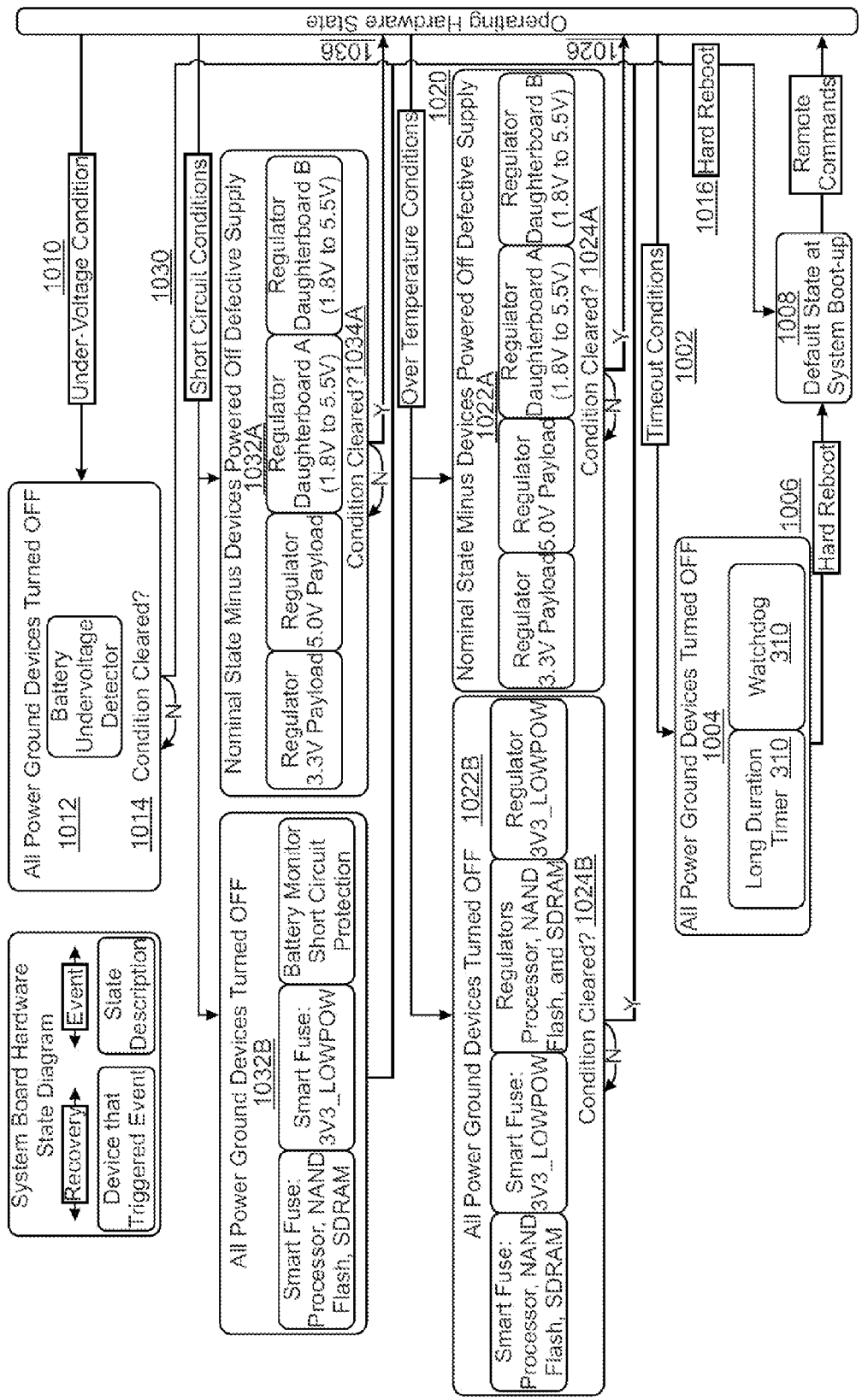
FIG. 10 is a flowchart diagram of the method operations in response to various conditions in the avionics package, in accordance with embodiments of the present invention.

FIG. 10 is a flowchart diagram of the method operations 1000 in response to various conditions in the avionics package 200, in accordance with embodiments of the present invention.

If a retrieving error occurs, the watchdog circuit 616 counts down due to the unsuccessful boot and a time out condition 1002 and initiates a hard reboot/power cycle 1004 by removing power for a brief time sufficient to discharge and shutdown the systems using power ground as a return current path (e.g., about 0.4 seconds). The power cycle 1004 also includes another retrieving attempt 1006. This process continues until the operating system image stored in the volatile memory 338 passes the checksum comparison.

The checksum comparison and the PCM non-volatile memory 342, provides a valid operating system image in the volatile memory 338 without requiring expensive radiation hardened, space rated components.

Catch All Recovery

A selected long time interval is manually selected in the long duration timer 620 prior to launch. The duration of the long time interval can be between about a day to as long as multiple days or even months. The long duration timer 620 can be configured like a typical watchdog 616, where a satellite command clears the timer. The long duration timer 620 can be completely isolated other than the ability to read the time remaining before a reset. A hard reboot 1004 of the avionics package 200 is initiated when the long duration timer 620 counts down to zero and the power is removed for a brief time sufficient to discharge and shutdown the systems using power ground as a return current path (e.g., about 0.4 seconds). This periodic reboot event is built into the satellite operations plan, and ensures an avionics package 200 reboot will occur no matter what state the satellite is in.

The long-duration timer 620 initiated reboot resets the avionics package 200 to a known good state. Therefore, regardless of the state of the avionics package 200 previous to the long-duration timer 620 initiated reboot, the reboot places the avionics package 200 an operational state.

If an under voltage (low state of battery 372 charge) is detected in an operation 1010, power is removed from the system in an operation 1012 by removing the bias from transistor/MOSFET 804. Removing the bias from transistor/MOSFET 804 disconnects power ground from battery ground and thus removes power ground as a return current path. As a result, the systems using power ground as a return current path are shut down. Power remains removed from the system (e.g., bias remains removed from transistor/MOSFET 804) until the under voltage condition is cleared (e.g., battery charge returns to a pre-defined level). Recall as described above, that the solar cells 380 are coupled to the batteries 372 throughout the entire flight and thus will recharge the batteries 372. Once the under voltage condition is cleared, a hard reboot 1016 is initiated to return the avionics package to an operational status.

If an over-temperature condition is detected by a temperature sensor in an operation 1020, a built in hysteresis 1022A, 1022B holds the satellite in an off state until the temperature is reduced to a suitable temperature. Once the over temperature condition is cleared, a hard reboot 1016 is initiated to return the avionics package to an operational status. This ensures the satellite comes back online in a safe, known state.

If power is removed due to a localized over temperature detection in a subsystem board or the payload in operation 1020, the power to that subsystem or payload is removed in an operation 1022A. When the over temperature condition clears in an operation 1024A, the operating system is notified that the subsystem can be restarted in an operation 1026.

If power is removed due to a smart fuse 617A, 617B overcurrent detection in an operation 1030, the power is removed for a brief time (e.g., about 0.4 seconds) in an operation 1032B, and a hard reboot 1016 is initiated into the operating system as described above.

If power is removed due to a localized over-current detection in a subsystem board or the payload in operation 1030, the power to that subsystem or payload is removed in an operation 1032A. When the over current condition clears in an operation 1034, the operating system is notified that the subsystem can be restarted in an operation 1036.

There are two power rails in the avionics package 200. One of the power rails will be power cycled by the above conditions, the other will never be power cycled, and must be toggled manually. This provides flexibility with the system design if certain components cannot be randomly power cycled.

The battery assemblies 372 are not electrically isolated from the solar cells 380 after deployment from the launch vehicle. This allows the avionics package 200 to continue charging the batteries 372 through unexpected radiation events, or after a low state of charge where most the spacecraft is powered down until the batteries reach a safe charge state. The only exception is if an individual battery cell experiences a fault. The faulty cell is then isolated from the rest of the system, while the functional cells continue to operate.

The avionics package 200 can be paired with an umbilical board that provides considerable functionality for ground-based development, testing and debugging, which is not necessary for the satellite while in space. The umbilical provides the following functionality:

Ethernet for the operating system
Serial debug port (terminal access)
Breakout of all payload development lines
Charging ability
Memory flashing (re-program with new operating system)
Battery charging from USB or AC to DC wall plug
Ability to remotely perform memory flashing
File transfer
Satellite charging
Automated main system board diagnostics The electronics contained on the umbilical require considerable power and board space. Some larger satellites will use Ethernet, but for small, power constrained satellites, Ethernet much more of a burden than a benefit. By offloading the Ethernet and other functions described above, the maximum utility is provided during ground development and testing, without taking up precious volume and power on the satellite during the mission.

The breakout of all payload development lines allows for full system diagnostics on a fully integrated spacecraft. If issues arise late in development on a fully assembled flight unit, data and control lines can be easily probed and monitored, without having to invasively disassemble the spacecraft.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A satellite system comprising:
a chassis;
an avionics package included within an upper portion of the chassis, the avionics package including:
a main system board, the main system board includes a long duration timer having a selectable time interval of between about one day and about 12 months and wherein the long duration timer is configured to interrupt power to at least a portion of the satellite when the long duration timer counts down to zero, wherein the at least a portion of the satellite includes a processor on the main system board and wherein the long duration timer is configured to interrupt power is not capable of being disabled and the interruption of power to the processor initiates a reset that will reset the avionics package to a known base operation configuration independent of a checksum or other error detection systems and wherein at least a portion of the avionics package is constructed on non-radiation hardened components;
a payload interface board;
at least one daughter board; and a battery board, the main system board, the payload interface board, the at least one daughter board, and the battery board residing in substantially parallel planes and wherein the payload interface board, the at least one daughter board, and the battery board are coupled to the main system board through one or more of a plurality of stackable connectors.

2. The system of claim 1, wherein the satellite system does not include radiation shielding.

3. The system of claim 1, wherein the main system board includes a processor coupled to a non-volatile phase change memory system and a volatile memory system.

4. The system of claim 3, wherein the non-volatile phase change memory system includes an image of an operating system stored therein in a computer readable media.

5. The system of claim 4, wherein the processor includes:
logic stored in a computer readable media for retrieving the operating system image stored in the non-volatile phase change memory system;
logic stored in a computer readable media for storing the retrieved operating system image in the volatile memory system;
logic stored in a computer readable media for calculating a checksum value of the operating system image stored in the volatile memory system and comparing the calculated the checksum value with a known value;
logic stored in a computer readable media for initiating a hard reboot if the calculated the checksum value is not equal to the known value; and
logic stored in a computer readable media for initiating booting the operating system from the volatile memory system if the calculated the checksum value is equal to the known value.

6. The system of claim 1, wherein the main system board includes a removable umbilical system coupled to the main system board by an umbilical connector, the umbilical connector providing access to the operate and debug the avionics package and a payload portion of the satellite wherein the removable umbilical system is removed before the satellite system is launched to reduce mass, volume and power consumption of the avionics package.

7. The system of claim 6, wherein the removable umbilical includes an Ethernet port.

8. The system of claim 6, wherein the removable umbilical includes a breakout of each one of a plurality of data lines, a plurality of control lines, a plurality of voltage rails in the avionics package and the payload portion of the satellite.

9. The system of claim 6, wherein the removable umbilical includes rewrite access to the phase change non-volatile memory in the main system board.

10. The system of claim 1, wherein the main system board includes:
a power ground selectively coupled to a first plurality of avionics package components through a first low side switch; and
a solar ground coupled to a battery ground during flight through a second low side switch.

11. A method of rebooting a satellite comprising:
retrieving an operating system image stored in a non-volatile phase change memory system;
storing the retrieved operating system image in the volatile memory system;
calculating a checksum value of the operating system image stored in the volatile memory system;
comparing the calculated the checksum value with a known value;
initiating a hard reboot if the calculated the checksum value is not equal to the known value;
booting the operating system from the volatile memory system if the calculated the checksum value is equal to the known value; and
interrupting power to at least the portion of the satellite when a long duration timer counts down to zero to initiate a system reboot independent of the value of the calculated checksum, wherein the at least a portion of the satellite includes a processor on the main system board and wherein the long duration timer is configured to interrupt power to the processor is not capable of being disabled and the interruption of power to the processor initiates a reset that will reset the avionics package to a known base operation configuration and wherein at least a portion of the avionics package is constructed on non-radiation hardened components.

12. The method of claim 11, wherein the satellite system does not include radiation shielding.

13. A method of rebooting at least a portion of a satellite comprising:
initiating a hard reboot if an operating system is corrupted including:
calculating a checksum value of the operating system image stored in a volatile memory system included in the satellite;
comparing the calculated the checksum value with a known value;
initiating the hard reboot if the calculated the checksum value is not equal to the known value; and
initiating the hard reboot of at least a portion of the satellite when a long duration timer counts down to zero independent of the value of the calculated checksum, wherein the long duration timer is included in the satellite, wherein the at least a portion of the satellite includes a processor and wherein the long duration timer is configured to interrupt power to the processor is not capable of being disabled and the interruption of power to the processor initiates a reset that will reset an avionics package included in the satellite system to a known base operation configuration and wherein at least a portion of the avionics package is constructed on non-radiation hardened components.

14. The method of claim 13, wherein initiating the hard reboot if the calculated the checksum value is not equal to the known value includes:
retrieving an operating system image stored in a non-volatile memory system in the satellite;
storing the retrieved operating system image in the volatile memory system; and
calculating a checksum value of the operating system image stored in the volatile memory system;
comparing the calculated the checksum value with a known value; and
booting the operating system from the volatile memory system if the calculated the checksum value is equal to the known value.

15. The method of claim 13, wherein the long duration timer has an interval of between about one day and about 12 months.

16. The method of claim 13, further comprising booting the operating system from the volatile memory system included in the satellite.

17. The method of claim 13, wherein initiating the hard reboot includes interrupting a battery ground to at least one portion of the satellite.

18. The method of claim 13, wherein initiating the hard reboot includes interrupting power to at least one portion of the satellite.

19. The method of claim 13, wherein initiating the hard reboot includes interrupting power to at least one portion of the satellite for less than about 1.0 seconds.

* * * * *